United States Patent [19]

Rehberger

[11] Patent Number: 5,275,214
[45] Date of Patent: Jan. 4, 1994

[54] APPARATUS FOR UNLOADING PRESSURIZED FLUID

[76] Inventor: Kevin M. Rehberger, 3600 Westhampton Dr., Martinez, Ga. 30907

[21] Appl. No.: 967,482

[22] Filed: Oct. 28, 1992

[51] Int. Cl.⁵ .................. B65B 31/00; B23K 7/10
[52] U.S. Cl. ....................... 141/65; 141/51; 141/98; 141/97; 222/80; 372/705; 219/121.7
[58] Field of Search .............. 141/98, 97, 65, 51; 222/5, 80, 81, 87; 372/705; 219/121.7, 121.71, 121.6, 121.67

[56] References Cited

U.S. PATENT DOCUMENTS

| | | | |
|---|---|---|---|
| 3,670,914 | 6/1972 | Poulsen, Jr. | 215/32 |
| 4,027,137 | 5/1977 | Liedtke | 219/121.7 |
| 4,192,438 | 3/1980 | Foster et al. | 222/5 |
| 4,288,005 | 9/1981 | Soo-Hoo | 222/5 |
| 4,349,054 | 9/1982 | Chipman et al. | 141/98 X |
| 4,407,341 | 10/1987 | Feldt et al. | 141/65 X |
| 4,565,301 | 1/1987 | Hubbard et al. | 222/5 |
| 4,690,180 | 9/1987 | Gold | 141/51 |
| 4,778,155 | 10/1988 | Suckevich et al. | 219/121.7 X |
| 4,944,333 | 7/1990 | Gold et al. | 141/51 |
| 4,966,317 | 10/1990 | Barr | 222/5 |
| 5,035,269 | 7/1991 | Pytryga et al. | 141/1 |
| 5,067,514 | 11/1991 | Leemput et al. | 137/318 |
| 5,073,694 | 12/1991 | Tessier et al. | 219/121.7 D |
| 5,114,043 | 5/1992 | Collins, Jr. | 141/65 |
| 5,163,483 | 11/1992 | Eckman | 141/51 X |

FOREIGN PATENT DOCUMENTS 0248337 12/1985 Japan ............... 219/121.71

Primary Examiner—Ernest G. Cusick
Attorney, Agent, or Firm—Brian Tumm; Harold M. Dixon; William R. Moser

[57] ABSTRACT

An apparatus for unloading fluid, preferably pressurized gas, from containers in a controlled manner that protects the immediate area from exposure to the container contents. The device consists of an unloading housing, which is enclosed within at least one protective structure, for receiving the dispensed contents of the steel container, and a laser light source, located external to the protective structure, for opening the steel container instantaneously. The neck or stem of the fluid container is placed within the sealed interior environment of the unloading housing. The laser light passes through both the protective structure and the unloading housing to instantaneously pierce a small hole within the stem of the container. Both the protective structure and the unloading housing are specially designed to allow laser light passage without compromising the light's energy level. Also, the unloading housing allows controlled flow of the gas once it has been dispensed from the container. The external light source permits remote operation of the unloading device.

17 Claims, 1 Drawing Sheet

APPARATUS FOR UNLOADING PRESSURIZED FLUID

The United States Government has rights in this invention pursuant to Contract No. DE-AC90-89SR18035 between the U.S. Department of Energy and Westinghouse Savannah River Company.

BACKGROUND OF THE INVENTION

1. Field of the Invention:

The present invention relates to apparatus for unloading the contents of fluid containers. More particularly, the present invention relates to an apparatus for remotely unloading and capturing pressurized, hazardous gas from a container.

2. Discussion of Background:

Apparatus used to discharge the contents of fluid containers are well known. There are hydrodermic-type devices for withdrawing gas from sealed vials, devices for punching holes into or tapping into container walls, and devices for mechanically shearing off the neck of a container. Also, fluid containers themselves have been designed to have structurally weakened areas, often called break seals, intended to be broken easily in order to discharge the container contents. See for examples of the foregoing U.S. Pat. No. 4,192,438, by Foster et al, and U.S. Pat. No. 4,565,301, by Hubbard et al. These devices are typically used in the field of nuclear medicine to retrieve radioactive Xenon gas while conducting ventilation studies upon patients. Both of the devices use compressed gas, such as compressed oxygen, mixed with the container contents to facilitate withdrawal of those contents. The mixture is then transferred to another chamber through the use of the device's outlet port.

Other opening devices use a mechanical punch assembly to pierce the container wall, thereby releasing the container contents. Such devices are typically used in the disposal of old containers that may still contain pressurized fluid, such as fluorohydrocarbons in discarded heat pumps or air conditioning compressors. Such an apparatus is described in U.S. Pat. No. 5,067,514, by Leemput et al. Also, punch assemblies are used for puncturing containers that release gas under pressure for other reasons such as inflating objects, as described in U.S. Pat. No. 4,966,317.

Still other devices used for dispensing the contents of fluid containers include devices that cut off the entire neck of the container by mechanical means. One such device is described in U.S. Pat. No. 4,288,005, issued to Soo-Hoo. The device features a tubular body having a slideable, driving ram. The neck of the container, preferably a gas bottle, is inserted into a transverse aperture located on the tubular body. Upon actuation, the driving ram travels down the tubular body and in the process, transversely cuts off the entire neck of the gas bottle.

A more effective means is needed for controllably releasing the contents of a fluid container, especially pressurized containers filled with toxic or otherwise hazardous gases.

SUMMARY OF THE INVENTION

According to its major aspects and broadly stated, the present invention is an apparatus for unloading fluid from their containers. In particular, it is an apparatus for enabling the removal of hazardous, pressurized gas from containers in such a way that the gas remains confined within a protective containment. The apparatus comprises a housing enclosed within at least one protective structure for receiving the dispensed contents of the steel container, a source of laser light external to the containment and selected for drilling a hole in the container quickly, and a pair of windows, one in the containment and one in the housing, through which the light from the laser can pass substantially unattenuated. The neck or stem of the container is placed within the interior of the housing and the housing is sealed to the container. The containment forms a seal over the container and housing. The laser light then passes through the windows of the containment and the housing to vaporize a portion of the stem of the container thereby burning a small hole for release of the container's contents. Both the containment and the housing allow laser light to pass without significant dispersion or loss of the light's energy level. Also, the housing has a means for controlling the flow of the gas once the hole in the container has been made. The external light source enables the remote breaching of the container.

A major feature of the present invention is the use of laser light for dispensing the contents of the container. In addition to its characteristics of precise controllability and speed of cutting and drilling, the laser light can originate from a source located outside of the containment, thereby allowing remote operation of the device. Mechanical container-breaching apparatus, on the other hand, must operate in or partly within the containment, thereby requiring a larger containment, decontamination of the apparatus, and more complicated systems for control of it.

Another feature of the present invention is the use of a containment surrounding both the pressurized container to be opened and the housing. The containment provides redundant protection from harmful gases in the container and from any initial burst of highly pressurized gases if the housing fails to contain any unloaded gases.

Still another feature is the use of windows on the protective structure and on the unloading housing. These windows, preferably made of quartz, allow laser light to pass through both structures without significant absorption or dispersion. Thus, the laser light source can be located external to the housing and containment, yet provide a laser light sufficient in direction, focus and energy level to properly breach the container. Also, an externally located laser source allows remote operation of the device, which provides further safety to operator.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
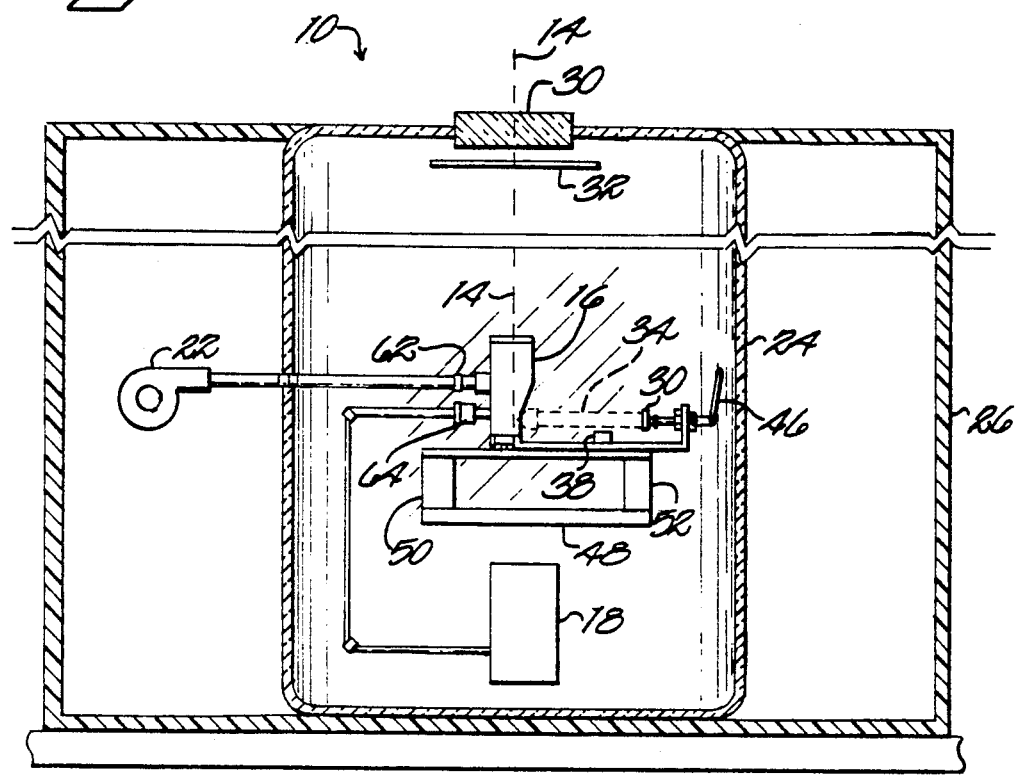
FIG. 1 is a side view of the unloading device according to a preferred embodiment of the present invention.

In the following description similar components are referred to by the same reference numeral in order to simplify the understanding of the sequential aspect of the drawings.

Referring now to FIG. 1, an unloading apparatus 10 generally comprises light 14 from a laser directed toward a housing 16. Housing 16 has an interior dimensioned for receiving the contents of a container of hazardous gas under pressure. The interior of housing 16 communicates with an expansion tank 18 and a vacuum pump 22. Both housing 16 and expansion tank 18 are located preferably within a removable first containment 24, which may be a Bell jar or similar protective structure having a window 30 that allows the passage of laser light 14 without significant attenuation, diffusion, or alteration of its path. Window 30 is preferably made of quartz glass.

A second containment 26 preferably encloses containment 24 and vacuum pump 22. Second containment 26 is preferably a glovebox sealing around window 30 so that laser light 14 can originate outside second containment 26 as well. A spatter guard 32 protects quartz window 30 from the hazardous contents of a breached container during unloading operations.

Figure 2:
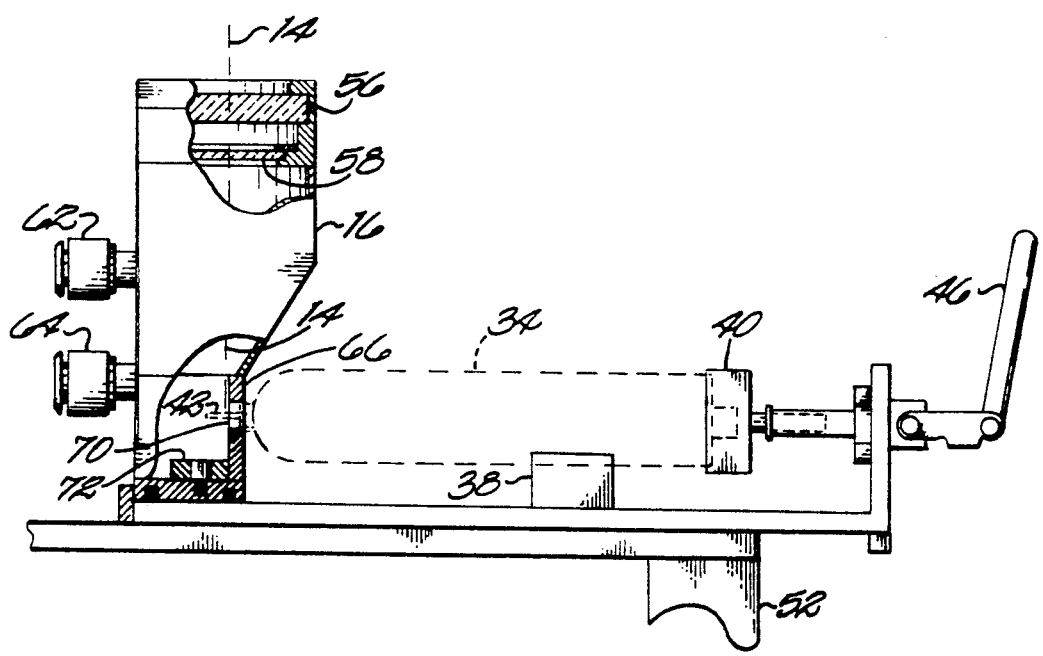
FIG. 2 is a partial cross-sectional view of the housing according to a preferred embodiment of the present invention.

A container 34 to be opened is held in place and in sealing engagement with housing 16 during operation by a support block 38 and a clamp 40 or other positioning means located near housing 16 (see also FIG. 2). Container 34 is preferably a standard container, such as a typical container 12-18 inches in length, 4-6 inches in diameter, and made of stainless steel with walls $\frac{1}{8}$ to $\frac{1}{4}$ inch thick. Preferably, a welded stem 42 approximately $\frac{1}{8}$ inch in diameter is located at the top of container 34. Clamp 40, actuated by handle 46, can be any mechanical assembly that can position container stem into and in sealing engagement with housing 16 and hold container 34 in place.

The top of support block 38 is formed to correspond to the exterior shape of container 34. Both housing 16 and clamp 40 reside on a support system preferably comprising a Bell jar test plate 48 equipped with balanced supports 50, 52.

In FIG. 2, container 34 is shown as positioned during proper operation of apparatus 10. Housing 16, preferably made of stainless steel, also has a quartz window 56 that allows laser light 14 to pass through without disruption. Also, a spatter guard 58, slidably inserted into housing 16, protects quartz window 56 from damage caused by the unloading of container 34. Spatter guard 58 is made of inexpensive glass in order to pass laser light without attenuation, diffusion or refraction and can easily be replaced when dirty or cracked.

A first connector 62 connects the interior of housing 16 and vacuum pump 22 (see FIG. 1). Similarly, a second connector 64 connects the interior of housing 16 and expansion tank 18. It is important to note that second connector 64 is not located directly opposite the lateral position of stem 42 within housing 16 in order to avoid the possibility of stem 42 entering second connector 64 if stem 42 happens to be longer than the depth of housing 16 and cause plugging during the unloading of container 34.

On one side of housing 16 is a reinforced wall 66 having a seal 70 dimensioned to receive container stem 42. Seal 70 is an O-ring or other type of seal to seal housing 16 to container stem when container 34 is inserted into housing 16 and clamped into position. A light scatter plate 72 is located at the bottom of housing 16 to protect housing 16 from laser light 14.

In use, container 34 is placed on support block 38 whereby stem 42 is moved toward housing wall 66. Using handle 46, clamp 40 urges container 34 toward unloading housing 16, the bottom of container 34 seated in clamp 40. Clamp 40 continues to move container 34 toward housing 16 until container stem 42 is inserted through seal 70. The position of clamp 40 is then locked until container 34 has been unloaded.

Laser light 14 generated from a source (not shown) external to apparatus 10 is then directed through window 30 of first and second containments 24, 26 and window 56 of housing 16 toward container stem 42. Since laser light 14 does not pass through any material that either alters its path or absorbs an appreciable amount of its energy, the energy of laser light 14 arrives virtually intact at container stem 42.

Upon contacting stem 42, laser light 14 quickly vaporizes a hole in stem 42, thereby enabling the release of the contents of container 34. Laser light can burn through up to $\frac{1}{4}$ inch of steel but the steel walls of stem 42 are each preferably only 3/100 inch thick. The rate of release of the contents of container 34 depends on the size of the holes created by laser light 14. Scatter plate 72 protects the bottom of housing 16 by absorbing and/or scattering any laser energy that passes through container stem 42. Additionally, spatter plate 58 protects quartz window 56 from any sparks produced as laser light 14 burns through stem 42 or any potentially damaging initial bursts of pressurized fluid unloaded from container 34.

Once laser light 14 burns through stem 42, and the pressurized contents of container 34 are released from container 34, gas immediately fills the airtight interior of housing 16. In the event the contents of container 34 are under extreme pressure, expansion tank 18 is used to reduce the pressure of unloading fluid by increasing the volumetric area into which the pressurized fluid flows. Thus, the container 34 is unloaded into housing 16 and expansion tank 18 for a lower and more manageable pressure. The fluid can then be withdrawn more controllably from housing 16 by vacuum pump 22.

It will be apparent to those skilled in the art that many changes and substitutions can be made to the preferred embodiment herein described without departing from the spirit and scope of the present invention as defined by the appended claims.

What is claimed is:

1. Apparatus for use in unloading contents of a container using laser light capable of forming a hole in said container, said apparatus comprising:

a containment having a window, said window adapted for passing said laser light substantially without attenuation and dispersion; and means for holding said container, said holding means positioned within said containment and holding said container so that said laser light can pass through said window and strike said container thereby making a hole in said container, said containment containing said contents of said container that leave said container through said hole;

means for withdrawing said contents of said container from said containment.

2. The apparatus as recited in claim 1, wherein said window is made of quartz.

3. The apparatus as recited in claim 1, wherein said contents of said container are under pressure and wherein said holding means further comprises a housing having an interior, said interior receiving said contents of said container.

4. The apparatus as recited in claim 1, wherein said contents of said container are under pressure and wherein said holding means further comprises a housing having a window and an interior, said interior receiving said contents of said container and said laser light passing through said window of said housing.

5. The apparatus as recited in claim 1, wherein said contents of said container are under pressure and wherein said holding means further comprises a housing having a window, an opening and an interior, said container being received in said opening into said interior and positioned so that said laser light can pass through said window of said housing and make a hole in said container, said contents of said container entering said housing through said hole and being confined in said housing.

6. The apparatus as recited in claim 1, wherein said contents of said container are under pressure and wherein said holding means further comprises a housing having a window, an opening and an interior, said container being received in said opening into said interior and positioned so that said laser light can pass through said window of said housing and make a hole in said container, said contents of said container entering said housing through said hole and being confined in said housing, said withdrawing means being in fluid communication with said interior.

7. The apparatus as recited in claim 1, wherein said contents of said container are under pressure and wherein said holding means further comprises a housing having a window, an opening and an interior, said container being received in said opening into said interior and positioned so that said laser light can pass through said window of said housing and make a hole in said container, said contents of said container entering said housing through said hole and being confined in said housing, said withdrawing means being in fluid communication with said interior, said apparatus further comprising an expansion tank in fluid communication with said interior of said housing for receiving a portion of said contents of said container.

8. Apparatus for use in unloading contents of a container using laser light capable of forming a hole in said container, said apparatus comprising:
 a containment having a first window, said window adapted for passing said laser light substantially without attenuation and dispersion;
 a housing within said containment and having an interior, a second window and an opening;
 means for holding said container, said holding means positioned in spaced relation to said housing so that said container is held in said opening, said container being held so that said laser light can strike said container after passing through said first and said second windows to make a hole in said container, said housing containing said contents of said container that leave said container through said hole; and
 means for withdrawing said contents of said container from said containment.

9. The apparatus as recited in claim 8, wherein said housing has means for sealing said opening, said sealing means sealing against said container so that contents of said container do not escape said housing.

10. The apparatus as recited in claim 8, further comprising means in spaced relation to and between said second window and said hole of said container for intercepting contents of said container to protect said second window.

11. The apparatus as recited in claim 8, further comprising an expansion tank, said expansion tank having an internal volume and being in fluid communication with said interior of said housing so that the contents of said container can be distributed between said interior of said housing and said expansion tank.

12. The apparatus as recited in claim 8, wherein said first and said second windows are made of quartz.

13. Apparatus for unloading gas from a pressurized container, said container having a wall, said apparatus comprising:
 means for generating a laser light beam having sufficient energy to penetrate said wall of said container;
 a housing having
  a first window adapted to pass said beam without significant attenuation, and
  a nozzle dimensioned to receive said container;
 means for holding said container stem in said housing through said nozzle so that said beam can strike said container;
 a tank in fluid communication with said housing so that said fluid flows from said container into said housing and said tank;
 a pump for withdrawing fluid from said sealed housing, said pump in fluid communication with the interior of said sealed housing; and
 a containment covering said pump, said tank, said holding means and said housing, said containment having a second window adapted to pass said beam,
 said first and said second windows positioned so that said beam can pass therethrough into said housing to said container, thereby said beam can burn a hole in said wall of said container and release said fluid into said housing.

14. The apparatus as recited in claim 13, wherein said first and said second windows are made of quartz.

15. The apparatus as recited in claim 13, further comprising means for absorbing at least a portion of said beam, said container positioned between said first window and said absorbing means.

16. The apparatus as recited in claim 13, further comprising means in spaced relation to, and between said first window and said hole of said container, for intercepting contents of said container to protect said first window.

17. The apparatus as recited in claim 13, further comprising means in spaced relation to and between said second window and said housing of said container for intercepting contents of said container to protect said second window.

* * * * *